(12) United States Patent
Toyoda

(10) Patent No.: US 6,897,985 B1
(45) Date of Patent: May 24, 2005

(54) INTERNET FACSIMILE APPARATUS AND ADDRESS INPUT METHOD

(75) Inventor: Kiyoshi Toyoda, Kunitachi (JP)

(73) Assignee: Panasonic Communications Co., Ltd., Fukuoka (JP)

( * ) Notice: Subject to any disclaimer, the term of this patent is extended or adjusted under 35 U.S.C. 154(b) by 0 days.

(21) Appl. No.: 09/506,807

(22) Filed: Feb. 18, 2000

(30) Foreign Application Priority Data

Aug. 30, 1999  (JP) ............................................. 11-243064

(51) Int. Cl.$^7$ ............................................. G06F 13/00
(52) U.S. Cl. ..................... 358/402; 358/1.15; 358/403; 358/407; 379/100.08; 379/100.09; 709/239
(58) Field of Search ................................ 358/402, 403, 358/407, 404, 406, 440, 442, 444, 408; 379/100.08, 93.01, 93.24, 100.09; 709/239, 204, 205, 206, 207, 240, 241, 242, 245

(56) References Cited

U.S. PATENT DOCUMENTS

| | | | |
|---|---|---|---|
| 5,721,620 A * | 2/1998 | Arai et al. .................... | 358/296 |
| 5,767,985 A | 6/1998 | Yamamoto et al. | |
| 5,805,298 A | 9/1998 | Ho et al. | |
| 5,805,810 A | 9/1998 | Maxwell | |
| 5,808,754 A * | 9/1998 | Itoh et al. .................... | 358/440 |
| 5,862,202 A | 1/1999 | Bashoura et al. ...... | 379/100.14 |
| 5,881,233 A | 3/1999 | Toyoda et al. | |
| 5,946,106 A * | 8/1999 | Itoh et al. .................... | 358/442 |
| 5,987,508 A * | 11/1999 | Agraharam et al. ........ | 709/217 |
| 6,012,088 A * | 1/2000 | Li et al. ....................... | 709/219 |
| 6,061,502 A * | 5/2000 | Ho et al. ..................... | 358/1.15 |
| 6,157,706 A * | 12/2000 | Rachelson ............. | 379/100.08 |
| 6,266,160 B1 | 7/2001 | Saito et al. .................. | 358/407 |
| 6,324,585 B1 * | 11/2001 | Zhang et al. ................ | 709/245 |
| 6,335,966 B1 * | 1/2002 | Toyoda ................... | 379/100.06 |
| 6,389,121 B1 * | 5/2002 | Terao ..................... | 379/100.08 |
| 6,411,393 B1 * | 6/2002 | Wakasugi ................. | 358/1.15 |
| 6,417,930 B2 * | 7/2002 | Mori .......................... | 358/1.15 |
| 6,557,045 B1 * | 4/2003 | Tsukui et al. ............... | 709/245 |
| 6,587,219 B1 | 7/2003 | Saito et al. ................. | 358/1.15 |
| 6,813,036 B1 * | 11/2004 | Matsushita ................. | 358/1.15 |

FOREIGN PATENT DOCUMENTS

| | | |
|---|---|---|
| EP | 0785482 | 7/1997 |
| EP | 0887995 | 12/1998 |
| FR | 2775148 | 8/1999 |
| JP | 8-242326 | 9/1996 |
| JP | 10-32600 | 2/1998 |
| JP | 0836315 A2 * | 4/1998 |
| JP | 10107842 | 4/1998 |
| JP | 11215286 | 8/1999 |
| JP | 11220601 | 8/1999 |
| JP | 00134402 | 5/2000 |
| JP | 0-183952 | 6/2000 |
| JP | 1024447 A2 * | 8/2000 |
| WO | 97/10668 | 3/1997 |
| WO | 98/56163 | 12/1998 |
| WO | 99/21351 | 4/1999 |

OTHER PUBLICATIONS

English Language Abstract of JP 10–107842.
English Language Abstract of JP 2000–183952.
English Language abstract of JP–10–32600.
English Language abstract of JP–2000–134402.
English Language abstract of JP–11–215286.
English Language abstract of JP–11–220601.
English Language Astract of JP–8–242326.

* cited by examiner

*Primary Examiner*—Edward Coles
*Assistant Examiner*—Alan Rahimi
(74) *Attorney, Agent, or Firm*—Greenblum & Bernstein, P.L.C.

(57) ABSTRACT

This Internet facsimile apparatus comprises a panel with a plurality of buttons, memory to store a default domain name, panel input control section that if a user name is input from said panel, adds said default domain name to said user name to create a mail address and mail transmission processing section that transmits e-mail directed to said mail address.

7 Claims, 8 Drawing Sheets

INTERNET FACSIMILE APPARATUS AND ADDRESS INPUT METHOD

BACKGROUND OF THE INVENTION

1. Field of the Invention

The present invention relates to an Internet facsimile apparatus and method for inputting an e-mail address of a destination to the Internet facsimile apparatus.

2. Description of the Related Art

Conventionally, Internet facsimile apparatuses (hereinafter referred to as "IFAX") as disclosed in the Unexamined Japanese Patent Publication No.HEI 8-242326 and U.S. Pat. No. 5,881,233 are proposed. Such an IFAX requires the operator to input an e-mall address for destination before transmission.

If the destination is a G3 facsimile, the transmission source IFAX can request an IFAX near the destination G3 facsimile to relay the transmission. When the transmission source IFAX requests the relay IFAX to relay the transmission, the operator needs to input a relay address including a predetermined relay command in the IFAX mail address to the transmission source IFAX.

However, the IFAX is generally not provided with a keyboard dedicated to inputs of alphabetic characters as in the case of a conventional G3 facsimile apparatus. For example, with the conventional IFAX, it is possible to switch to alphabetic input mode and use function keys to enter alphabetic characters. However, since the function keys are relatively small, the conventional IFAX is susceptible to input errors when a relatively long mail address is input and is not operator-friendly.

SUMMARY OF THE INVENTION

The present invention has been implemented taking into account the points described above and it is an objective of the present invention to provide an Internet facsimile apparatus and address input method that will provide a simple and reliable way of inputting mail addresses.

It is another objective of the present invention to provide an apparatus that when the operator enters a user name, will add a default domain name to this user name and generate a mall address.

It is a further objective of the present invention to provide an apparatus that when the operator enters a FAX telephone number, will add this FAX telephone number to the mail address of the relay apparatus and generate a mail address for a relay request.

When a user name is entered from the panel, the present invention adds a default domain name to the user name, obtains a mail address and transmits e-mail using this mail address. As a result, with the present invention all that the operator needs to do is simply enter the user name.

Furthermore, when a FAX telephone number is entered from the panel, the present invention attaches the mail address of the relay apparatus to the FAX telephone number above, obtains the relay request mail address and transmits e-mail using this relay request mail address. As a result, all that the operator needs to do is simply enter the FAX telephone number of the final destination.

An Internet facsimile apparatus according to a first aspect of the present invention comprises a panel with a plurality of buttons, memory to store a default domain name, panel input control section that when a user name is entered from the panel, adds the default domain name to the user name and generates a mail address and mail transmission processing section that transmits e-mail directed to the mail address.

In this configuration, when the operator enters the user name from the panel, the panel input control section adds the default domain to the user name and generates the mail address, and therefore all that the operator needs to do is simply enter the user name.

An Internet facsimile apparatus according to a second aspect of the present invention comprises a panel with a plurality of buttons, memory to store a default domain name, decision section that when the input data from the panel does not include any "@", decides that the input data is the user name, panel input control section that when the decision section decides that the input data is a user name, adds the input data to the user name and generates a mail address and mail transmission processing section that transmits e-mail directed to the mall address.

In this configuration, when the operator enters the user name from the panel, since the user name does not include any "@" indicating a border between an address and domain name, the panel input control section decides that this input data is the user name, adds the default domain to this user name to generate a mail address, and therefore all that the operator needs to do is simply enter the user name.

An Internet facsimile apparatus according to a third aspect of the present invention comprises a panel with a plurality of buttons, memory to store a relay apparatus mail address, panel input control section that when a FAX telephone number is entered from the panel, adds the relay apparatus mail address to the FAX telephone number and generates a relay request mail address and mail transmission processing section that transmits e-mail directed to the relay request mail address.

In this configuration, when the operator enters the user name from the panel, the panel input control section adds the FAX telephone number to the relay apparatus mail address to generate a relay request mail address, and therefore all that the operator needs to do is simply enter the FAX number.

An Internet facsimile apparatus according to a fourth aspect of the present invention comprises a panel with a plurality of buttons, memory to store a default domain name, decision section that when the input data from the panel only consists of numbers, decides that the input data is the FAX telephone number of the final destination, panel input control section that when the decision section decides that the input data is the FAX telephone number of the final relay destination, adds the relay apparatus mail address to the FAX telephone number to generate a relay request mail address and mail transmission processing section that transmits e-mail directed to the relay request mail address.

In this configuration, when the operator enters the FAX telephone number from the panel, since the FAX telephone number generally consists of numbers only, the panel input control section decides that this input data is the FAX telephone number of the final relay destination, adds the FAX telephone number to the relay apparatus mail address and generates a relay request mail address, and therefore all that the operator needs to do is simply enter the user name.

BRIEF DESCRIPTION OF THE DRAWINGS

The above and other objects and features of the invention will appear more fully hereinafter from a consideration of the following description taken in connection with the accompanying drawing wherein one example is illustrated by way of example, in which.

DETAILED DESCRIPTION OF THE PREFERRED EMBODIMENTS

With reference now to the attached drawings, an embodiment of the present invention is explained in detail below.

Figure 1:
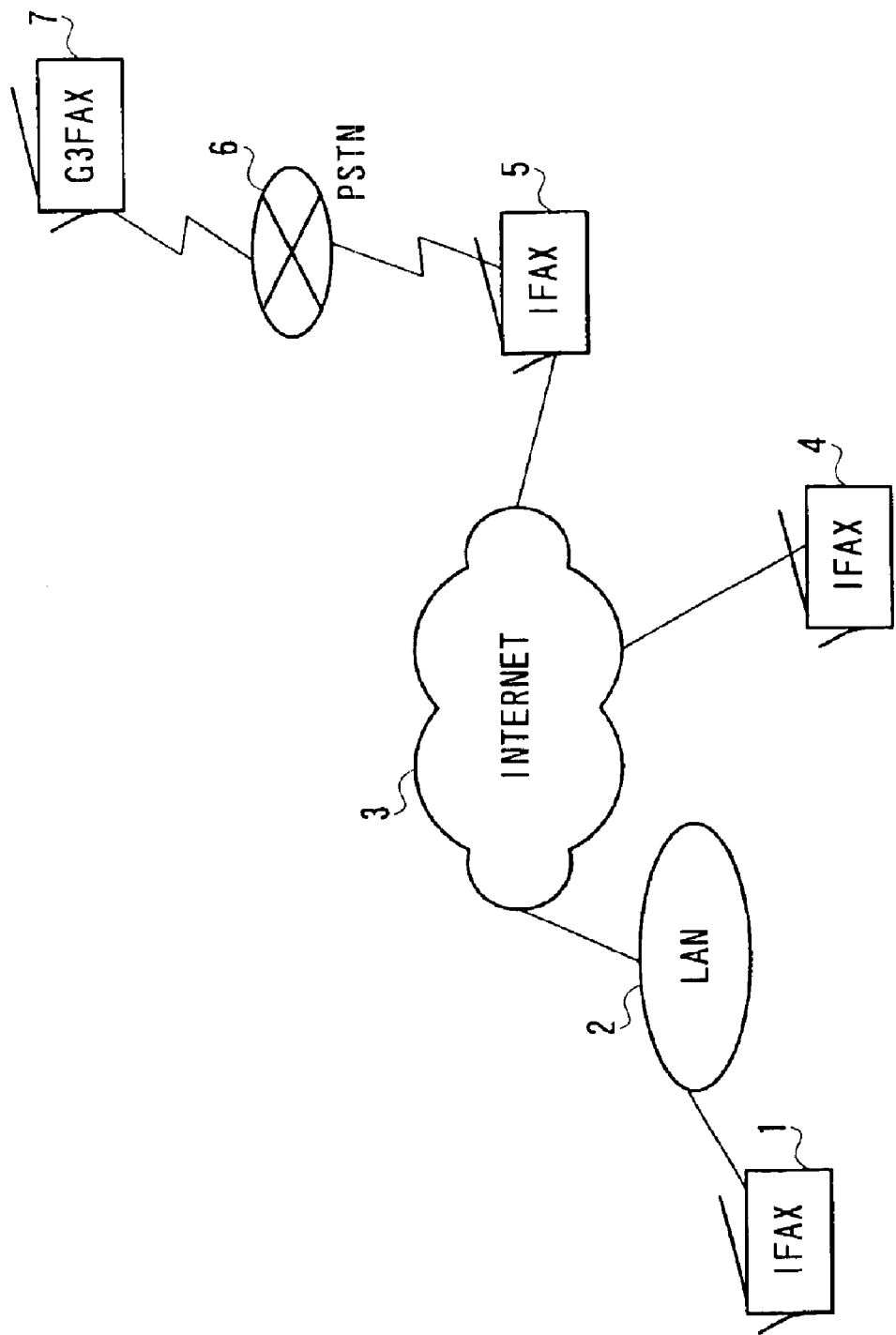
FIG. 1 is a conceptual diagram showing a network on which an Internet facsimile apparatus according to an embodiment of the present invention operates.

FIG. 1 is a conceptual diagram showing a network on which the Internet facsimile apparatus according to an embodiment of the present invention operates.

Internet facsimile apparatus according to the present embodiment (hereinafter referred to as "IFAX") 1 is connected to LAN 2. This LAN 2 is connected to Internet 3. IFAX 4 on the receiving side is connected to this Internet 3. Moreover, relay apparatus IFAX (hereinafter referred to as "relay apparatus") 5 is connected to Internet 3. This relay apparatus 5 is connected to a Public Switched Telephone Network (PSTN) 6. G3FAX 7 is connected to PSTN 6.

IFAX 1 transmits/receives image, etc. to/from IFAX 4 by e-mail via LAN 2 and Internet 3. Furthermore, IFAX 1 requests relay apparatus 5 to relay data to G3FAX 7. Relay apparatus 5 converts the e-mail data received from IFAX 1 to facsimile data and transmits this facsimile data to G3FAX 7.

Figure 2:
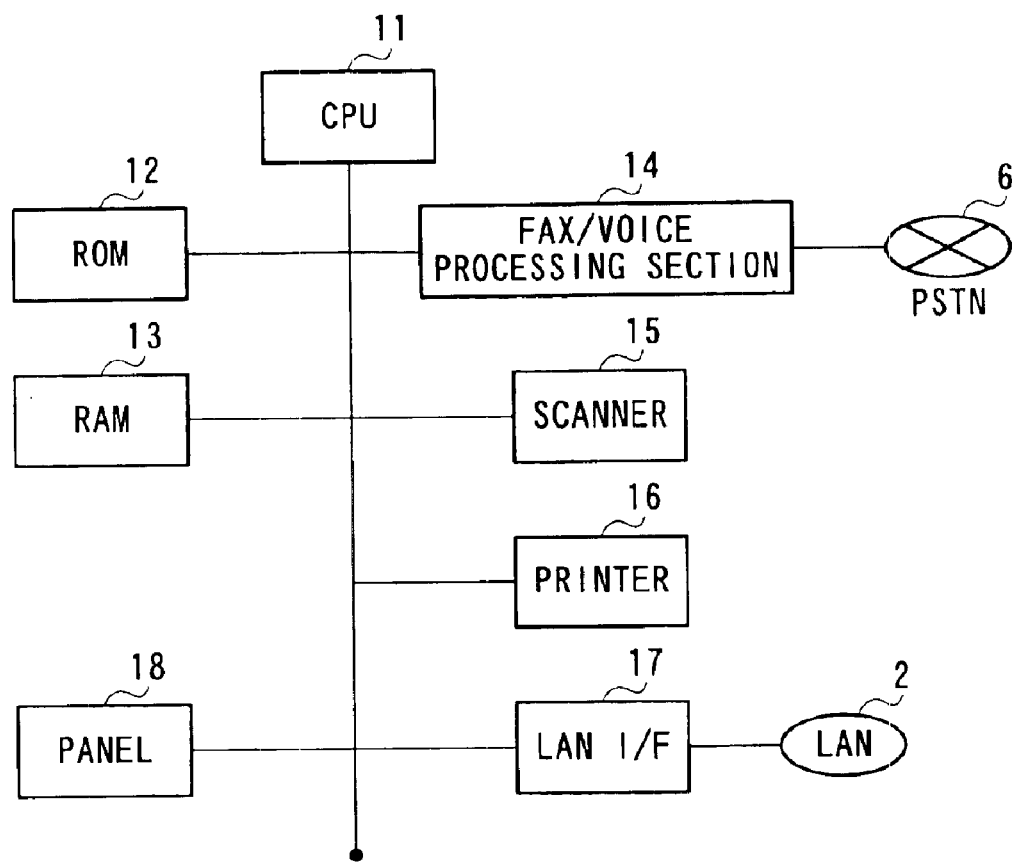
FIG. 2 is a block diagram showing IFAX hardware according to the embodiment above.

A detailed explanation of IFAX 1 according to the present embodiment is given below. FIG. 2 is a block diagram showing the IFAX hardware according to the present embodiment. CPU 11 executes a program and controls the entire apparatus. ROM 12 stores the program that CPU 11 executes.

RAM 13 provides a work area to execute the program and a buffer area to temporarily store various kinds of data such as e-mail and image files.

FAX/voice processing section 14 modulates facsimile data and voice, outputs modulated data to PSTN 6 and demodulates the modulated data received from PSTN 6 to facsimile data and voice data.

Scanner 15 scans a document and obtains image of the document. Printer 16 prints various kinds of data including the received image data.

LAN interface 17 executes the necessary procedure to transmit/receive data on LAN 2.

Panel 18 is provided with dial keys and a touch panel and receives operations by the operator such as specification of a destination or a command to start transmission.

Figure 3:
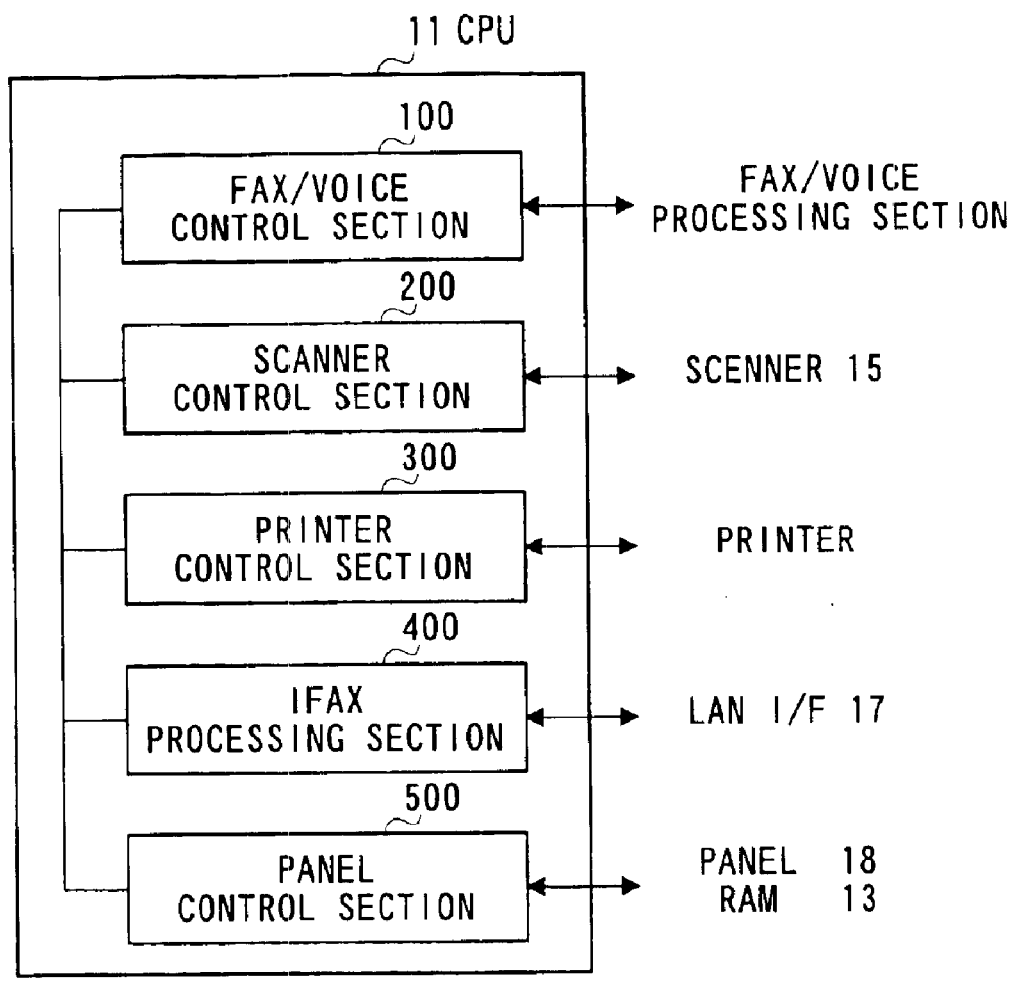
FIG. 3 is a block diagram showing functions of the IFAX according to the embodiment above.

ROM 12 stores a program and CPU 11 executes that program. The functions implemented as a result are explained below. FIG. 3 is a block diagram showing functions of IFAX 1 according to the present embodiment.

IFAX 1 comprises FAX/voice control section 100, scanner control section 200 and printer control section 300, and controls processing sections such as FAX/voice processing section 14, scanner 15 and printer 16.

IFAX 1 further comprises IFAX processing section 400 that implements the function as an IFAX. IFAX 1 further comprises panel control section 500 that controls inputs from panel 18.

Figure 4:
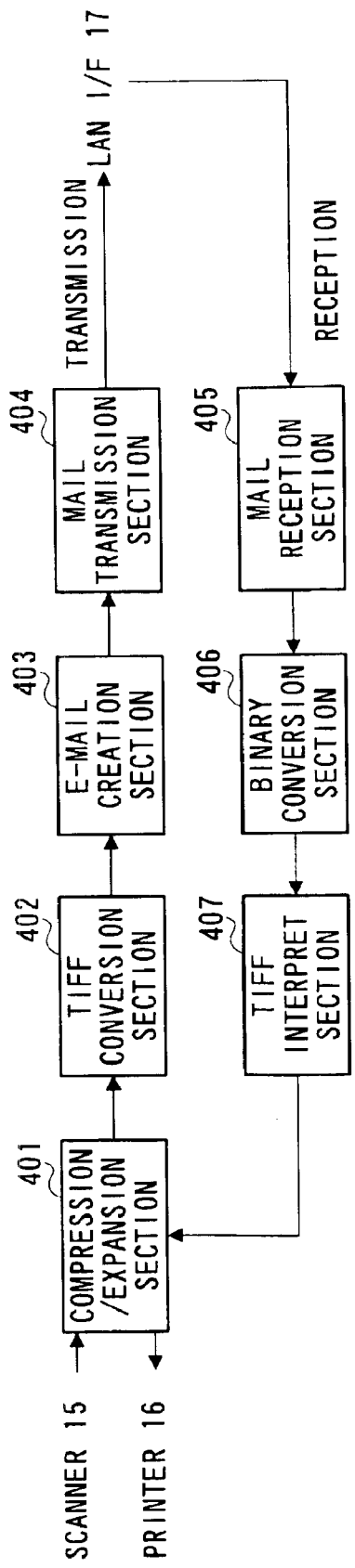
FIG. 4 is a functional block diagram showing an IFAX processing section of the IFAX according to the embodiment above.

FIG. 4 is a functional block diagram showing IFAX processing section 400 of the IFAX according to the embodiment above. Scanner control section 200 sends image data (e.g., bitmap data) scanned by scanner 16 to IFAX processing section 400. Documents are scanned by scanner 16 for one page of document at a time, and therefore image data is created for one page of document at a time. IFAX processing section 400 compresses image data in a compression format such as MH by compression/expansion section 401 and obtains compressed data. This compressed data is converted by TIFF conversion section 402 to one TIFF (Tagged Image File Format) file. This TIFF file is attached to multi-part mail by e-mail creation section 403 according to MIME (Multipurpose Internet Mail Extension), for example, and in this way I-FAX mail is created.

The created I-FAX mail is sent to a mail server by mail transmission section 404 according to SMTP (Simple Mail Transfer Protocol), for example, via LAN interface 17.

On the other hand, in IFAX processing section 400, when mail reception section 405 receives I-FAX mail via LAN interface 17, binary conversion section 406 converts an attached file included in the I-FAX mail from text codes to binary data and obtains a TIFF file. TIFF interpret section 407 interprets the TIFF file to obtain compressed data. Compression/expansion section 401 expands these compressed data and obtains image data. Printer 16 prints these image data.

Figure 5:
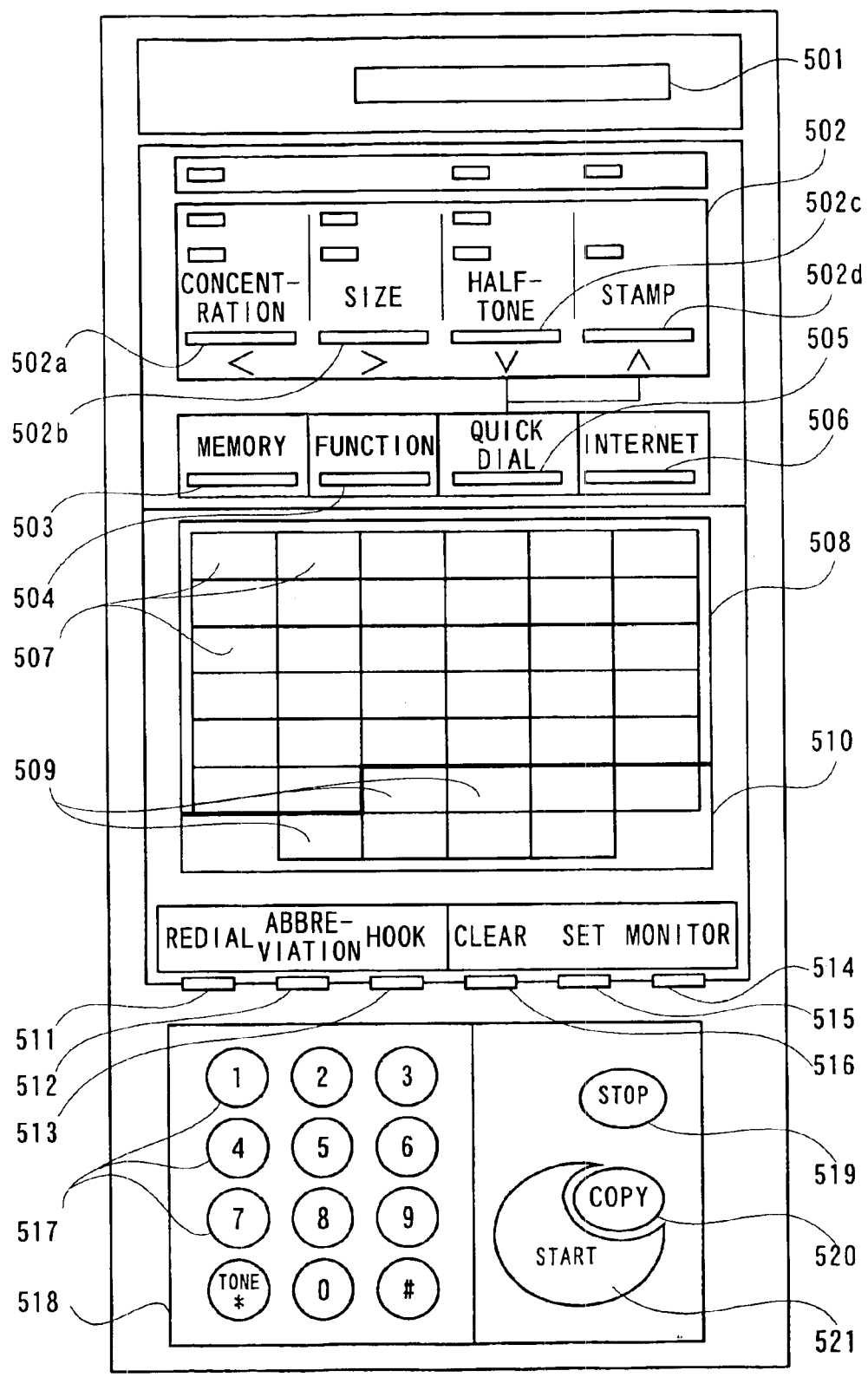
FIG. 5 is a floor plan showing a panel of the IFAX according to the embodiment above.

FIG. 5 is a floor plan showing panel 18 of the IFAX according to the embodiment above.

Panel 18 comprises display section 501 made up of an LCD, for example, at the top. Below display section 501 is printing setting section 502 that includes a plurality of printing setting buttons 502a to 502d to perform printing settings such as printing concentration, character size, halftone and confirmation stamp.

Below printing setting section 502, there are memory button 503, function button 504, quick dial button 505 and Internet button 506 from left to right.

Below these buttons 503 to 506 is one-touch dial section 508 with an array of one-touch dial buttons 507. Below one-touch dial section 508 is program communication section 510 with an array of program buttons 509.

Below program communication section 510 are redial/pause button 511, abbreviated dialing button 512, subaddress/hook button 513, clear/monitor sound volume button 514, set button 515 and monitor button 516.

Below these buttons 511 to 516 and on the left side of panel 18 is ten-key section 518 with an array of ten-keys 517. On the right side of this ten-key section 518 are stop button 519, copy button 520 and start button 521.

Figure 6:
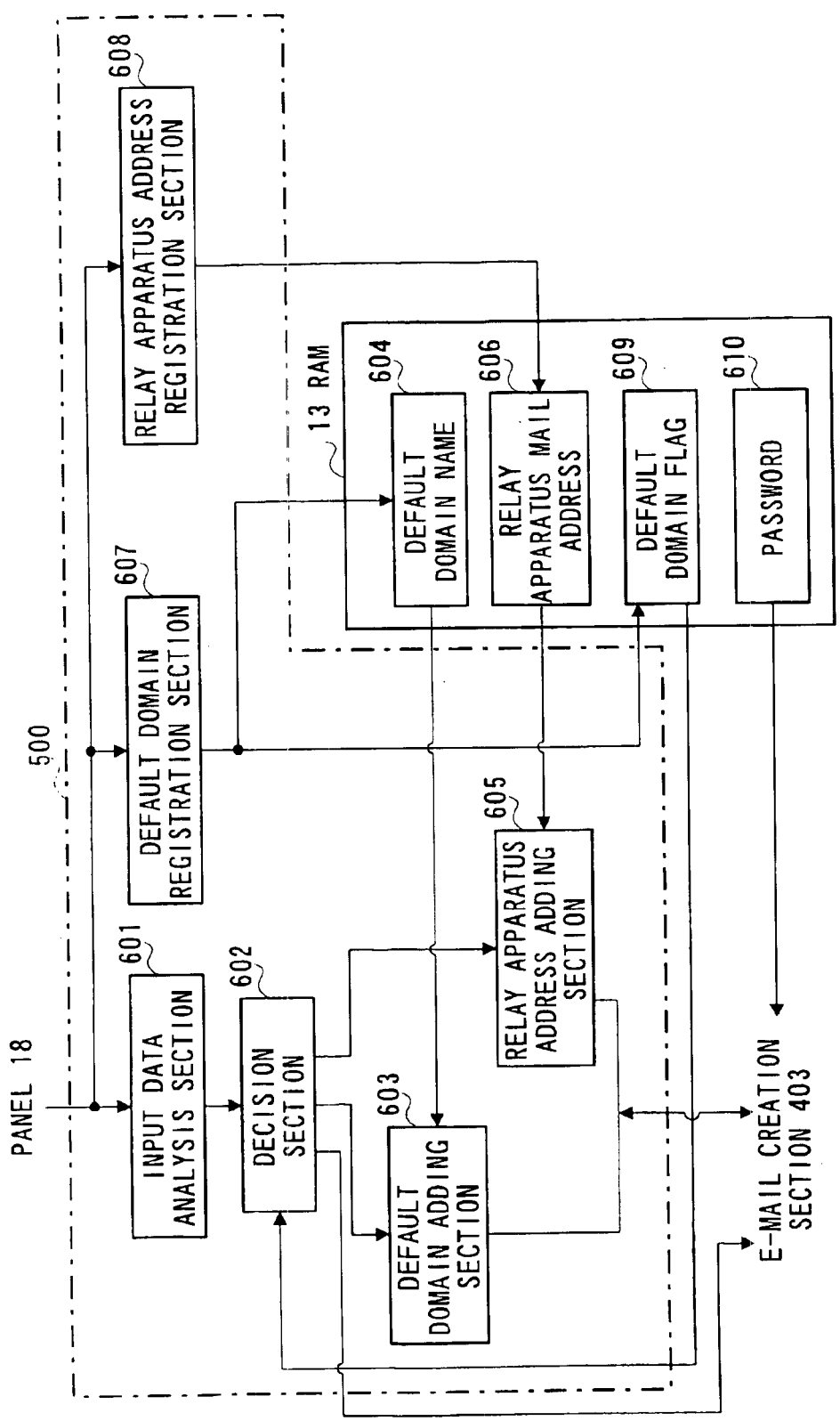
FIG. 6 is a block diagram showing functions of a panel control section of the IFAX according to the embodiment above.

FIG. 6 is a block diagram showing functions of panel control section 500 of the IFAX according to the embodiment above. Panel control section 500 comprises input data analysis section 601 that analyzes input data. Input data analysis section 601 analyzes input data and sends the analysis result to decision section 602. Input data analysis section 601 analyzes whether the input data contains "@" or not, that is, whether the input data is a user name or not. Input data analysis section 601 further analyzes whether the input data only consists of numbers or not, that is, whether the input data is a FAX telephone number or not.

Decision section 602 decides the subsequent processing based on the analysis result of input data analysis section 601 and whether Internet button 506 of panel 18 has been held down or not.

If the input data is a user name, default domain adding section 603 adds default domain name 604 stored in RAM 13 to this user name, obtains a mail address and sends the mail address to e-mail creating section 403.

If the input data is a FAX telephone number, relay apparatus address adding section 605 adds relay apparatus mail address 606 stored in RAM 13 to the FAX telephone number, obtains a relay mail address, adds a command character (e.g., FAX#) indicating relay before the FAX telephone number and a relay domain name after the FAX telephone number, creating a mail address "FAX#FAX number@domain name" and sends the mail address to e-mail creation section 403.

Default domain registration section 607 registers the default domain name input from panel 18 in RAM 13 in registration mode. Likewise, relay apparatus address registration section 608 registers the relay apparatus mall address input from panel 18 in RAM 13.

RAM 13 is also provided with an address indicating default domain flag 609 and when this default domain flag 609 is on, default domain adding section 603 adds a default domain to the input data. RAM 13 is further provided with an address for storing password 610, and e-mail creation section 403 adds this password to the text section of e-mail when e-mail is sent to the relay apparatus.

Figure 7:
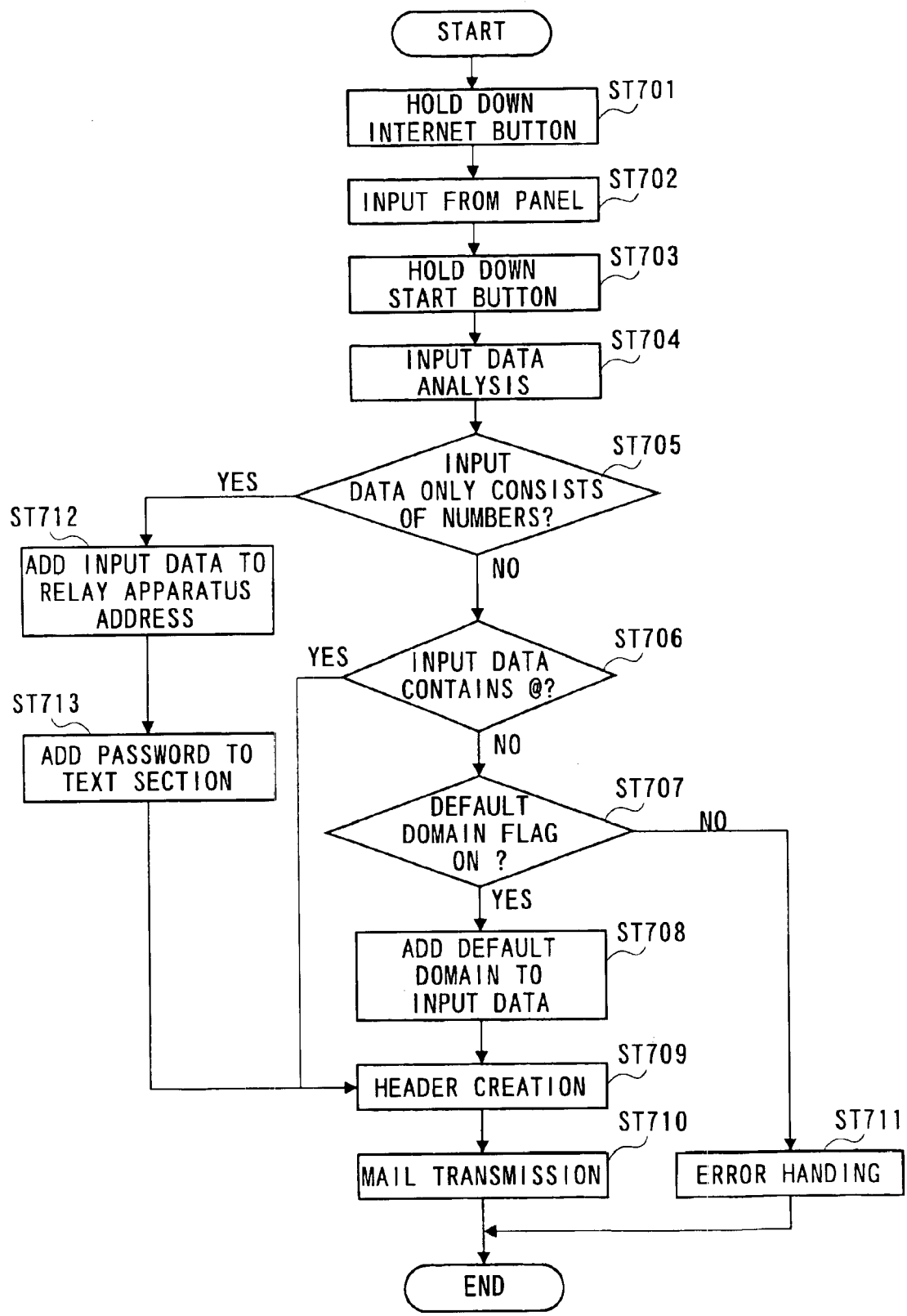
FIG. 7 is a flow diagram showing e-mail transmission steps in the IFAX according to the embodiment above.

Then, the e-mail transmission operation of IFAX 1 configured as shown above is explained. FIG. 7 is a flow diagram showing e-mail transmission steps of the IFAX according to the embodiment above.

After placing a document on a document stand of IFAX 1, the operator holds down Internet button 506 (ST701). In this case, panel control section 500 changes the input mode of panel 18 to a character string input mode. This allows the operator to enter a character string such as alphabetic characters and symbols using one-touch dial button 507 and program button 509 of panel 18.

Then, the operator enters the destination data from panel 18 (ST702). Then, the operator holds down start button 521 and commands the start of transmission processing (ST703).

Input data analysis section 601 of panel control section 500 analyzes the inputted data (ST704). Input data analysis section 601 sends this analysis result to decision section 602.

Decision section 602 decides whether the inputted data only consists of numbers or not (ST704). If the inputted data consists not only of numbers, that is, the inputted data consists of alphabetic characters and/or symbols, decision section 602 decides whether the inputted data contains any "@" or not (ST706). Here, if no "@" is included, decision section 602 decides that the input data is the user name of the mall address.

Then, decision section 602 accesses the address of default domain flag 609 of RAM 13 and decides whether default domain flag 609 is on or not (ST707). If default domain flag 609 in ST707 is on, decision section 602 commands default domain adding section 603 to send the inputted data. Default domain adding section 603 adds a default domain to the inputted data, that is, the user name (ST708). Default domain adding section 603 sends the mail address generated to e-mall creation section 403 of IFAX processing section 400 (ST709).

E-mail creation section 403 specifies this mail address to destination field [To:] or [Cc:] and creates a header (ST709). E-mail creation section 403 further adds the text section and data section to the header and creates e-mail, and mail transmission section 404 sends this e-mail (ST710).

If the default domain flag is off in ST707, since the inputted data does not conform to the mail address format, decision section 602 decides an input error and carries out error handling (ST711).

On the other hand, if an "@" is included in the inputted data in ST705, decision section 603 decides that the inputted data is a mail address and skips ST706 and ST707 and moves the processing to ST708, creates and transmits e-mail directed to the corresponding mail address (ST710).

In ST704, if decision section 603 decides that the inputted data only consists of numbers, the input data is sent to relay apparatus address adding section 605. Relay apparatus address adding section 605 adds the inputted data, that is, the FAX telephone number to the relay apparatus address according to the relay mail address form and creates a relay mail address (ST712). For example, if a telephone number ○○○○ is entered, a relay mail address [FAX#○○○○@relay apparatus domain name] is created.

Then, e-mail creation section 403 of IFAX processing section 400 of IFAX 1 adds password 610 extracted from RAM 13 to the first line of the text section of e-mail (ST713). Then, e-mail creation section 403 creates a header and creates e-mail (ST709). Mail transmission section 404 sends the e-mail created (ST710).

Figure 8:
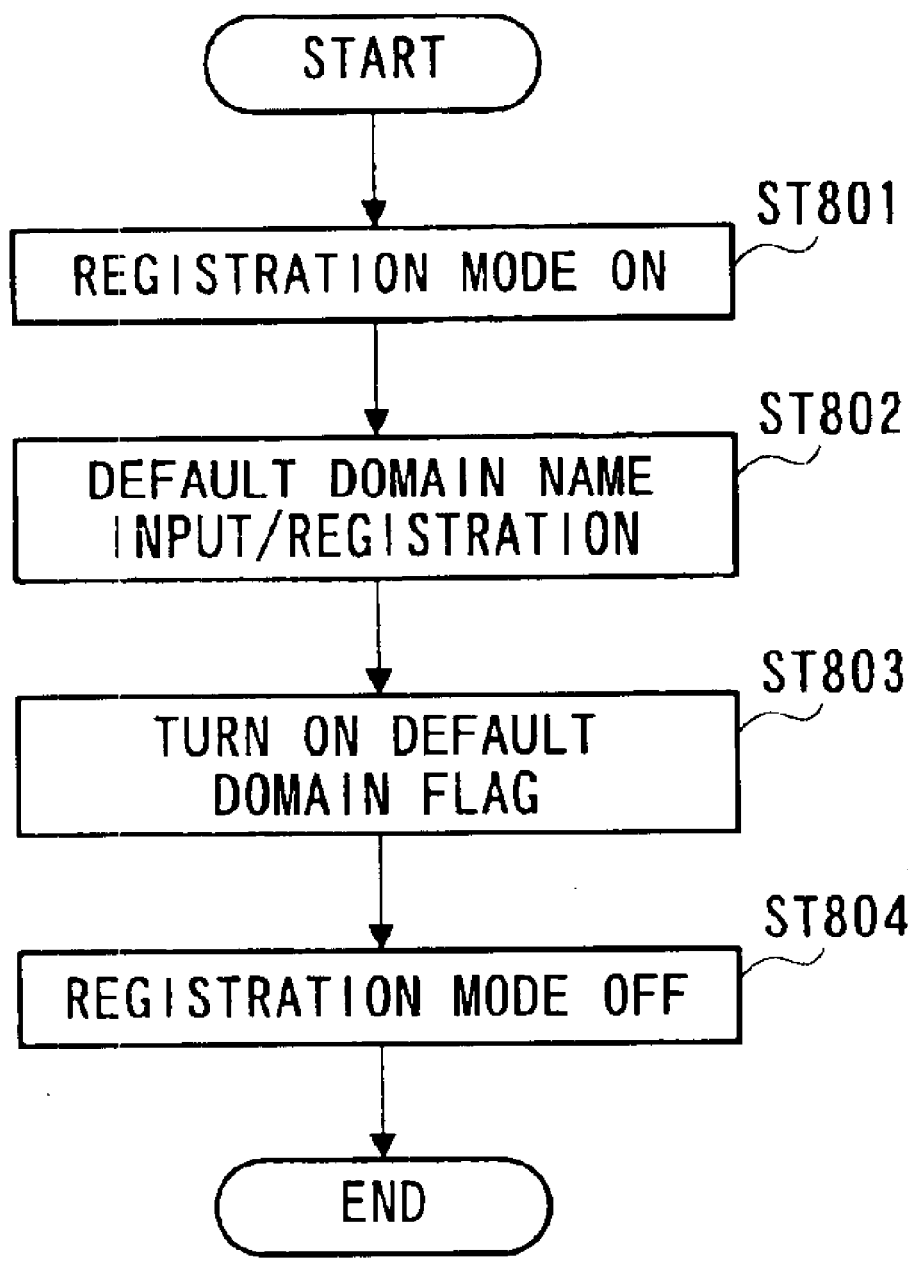
FIG. 8 is a flow diagram showing default domain name registration steps in the IFAX according to the embodiment above.

FIG. 8 is a flow diagram showing default domain name registration steps of the IFAX according to the embodiment above.

When the operator holds down a specific button, panel control section 500 enters registration mode (ST801). When the operator enters a default domain name from panel 18, default domain registration section 607 of panel control section 500 registers the default domain name entered in a predetermined address in RAM 13 (ST802). Then, default domain registration section 607 turns on the default domain flag (ST803). Then, panel control section 500 turns off the registration mode (ST804). Relay apparatus address registration section 608 also registers the relay apparatus address in the same way.

As explained above, according to IFAX 1 of the embodiment above, input data analysis section 601 analyzes the inputted data from panel 18 and based on this analysis result, if decision section 602 decides that the inputted data is the user name of the mail address, default domain adding section 603 captures the default domain name from RAM 13 and adds the default domain name to this user name. Since the operator only needs to enter the user name, this allows the operator to enter the destination mail address from panel 18 whose input operation is relatively difficult with ease and without errors.

If decision section 602 decides that the inputted data is not the user name but mail address, that is, when the inputted data includes an "@" in this example, decision section 602 commands e-mail creation section 403 to create a header by specifying the input data as the destination. Therefore, the operator only needs to enter a mail address without being aware of other things.

If default domain flag 609 is on, decision section 602 enables default domain adding section 603, and therefore the operator can use the default domain name according to the operator's need. Furthermore, when default domain name 604 is registered in RAM 13, as shown in FIG. 8, default domain registration section 607 turns on default domain flag 609, and therefore can automatically enable default domain adding section 603 when the default domain name is registered.

Furthermore, according to IFAX 1 of the embodiment above, after Internet button 506 of panel 18 is held down and if only numbers are entered from panel 18, decision section 602 decides that the FAX telephone number of the final relay destination has been entered. In this case, relay address adding section 605 adds this FAX number to the relay apparatus mail address stored in RAM 13 and creates a relay address. e-mail creation section 403 creates a header by specifying this relay address as the destination. Therefore, the operator only needs to press Internet button 506 to enter the FAX number and needs not to enter a relatively long relay address from panel 18. As a result, the operator can enter a relay request from panel 18 whose entry is relatively difficult to the relay apparatus with ease and without errors.

Moreover, since the relay request processing above is carried out when the operator holds down Internet button 506 and then enters the FAX number, and if the operator enters the FAX number without pressing Internet button 506, normal facsimile transmission is carried out, which is advantageous in not forcing the operator to do extra operations.

The present invention is not limited to the embodiment above. The embodiment above explained the Internet facsimile apparatus incorporating the G3/G4FAX and IFAX functions as an example, but the present invention is also applicable to an Internet facsimile apparatus incorporating only the IFAX functions. Furthermore, the present invention is also applicable to an information processing terminal with the IFAX functions such as copier, network scanner, network printer, image combiner and personal digital assistant (PDA), etc.

The present invention further includes a storage medium storing the program executed by the CPU to carry out the same processing as that of the Internet facsimile apparatus according to the embodiment above. Moreover, the present invention is also applicable to a personal computer to which a scanner is connected, comprising a network communication section and executing the program stored in said storage medium.

The present invention is not limited to the above described embodiments, and various variations and modifications may be possible without departing from the scope of the present invention.

This application is based on the Japanese Patent Application No.HEI11-243064 filed on Aug. 30, 1999, entire content of which is expressly incorporated by reference herein.

What is claimed is:

1. An Internet facsimile apparatus comprising:
   a panel with a plurality of keys;
   a memory configured to store a default domain name; and
   a controller configured to generate, when a user name not including "@" is input via the panel, an e-mail address by adding the default domain name stored in the memory to the user name input by the panel, and further configured to transmit an e-mail directed to the generated e-mail address, wherein
   the controller is further configured to input "@" between the user name input via the panel and the default domain name stored in the memory when the controller generates the e-mail address.

2. The Internet facsimile apparatus according to claim 1, wherein the controller, when a user name including "@" is input by the panel, is configured to judge that an entire e-mail address including the user name is input via the panel, and is further configured to transmit an e-mail directed to the e-mail address input via the panel.

3. The Internet facsimile apparatus according to claim 1, further comprising a memory configured to store a status of a domain flag, the status of the domain flag indicating whether the controller adds the default domain name stored in the memory to the user name input via the panel when the user name not including "@" is input by the panel, wherein,
   the controller, when the status of the domain flag is ON, is configured to add the default domain name stored in the memory to the user name input by the panel.

4. A mail address creating method comprising:
   storing a default domain name;
   inputting a user name;
   adding the stored default domain name to the input user name when the input user name does not contain "@"; and
   generating an e-mail by inputting "@" between the input user name and the stored default domain name when the stored default domain name is added to the input user name.

5. An Internet facsimile apparatus connected to a relay apparatus, the replay apparatus relaying facsimile data which is attached to an e-mail to another facsimile apparatus, the Internet facsimile apparatus comprising:
   a panel with a plurality of keys;
   a memory configured to store a domain name of the relay apparatus; and
   a controller configured to generate, when a facsimile number is input by the panel, an e-mail address by adding, the domain name of the relay apparatus stored in the memory and a command indicating an instruction to relay the facsimile data to the another facsimile apparatus, to the facsimile number input via the panel, and transmits an e-mail directed to the generated e-mail address, wherein the controller is further configured to:
   set the command before the facsimile number input via the panel;
   set the domain name of the relay apparatus stored in the memory after the facsimile number input via the panel; and
   input "@" between the facsimile number input via the panel and the domain name of the relay apparatus stored in the memory when the controller generates the e-mail address.

6. The Internet facsimile apparatus according to claim 5, wherein the controller, when only numbers are input by the panel, is configured to judge that the facsimile number is input by the panel.

7. A mail address creating method, the mail address being utilized by an Internet facsimile apparatus, the Internet facsimile apparatus connected to a relay apparatus, the relay apparatus relaying facsimile data which is attached to an e-mail to another facsimile apparatus, the Internet facsimile apparatus having a panel with a plurality of keys, the mail address creating method comprising:

storing a domain name of the relay apparatus;

inputting a facsimile number;

adding, the domain name of the relay apparatus stored in the memory and a command indicating an instruction to relay the facsimile data to the another facsimile apparatus, to the facsimile number input via the panel;

generating an e-mail address by setting the command before the facsimile number input by the panel, by setting the domain name of the relay apparatus stored in the memory after the facsimile number input via the panel, and by inputting "@" facsimile number input via the panel and the domain name of the relay apparatus stored in the memory; and transmitting an e-mail directed to the generated e-mail address.

* * * * *

UNITED STATES PATENT AND TRADEMARK OFFICE
CERTIFICATE OF CORRECTION

| | | |
|---|---|---|
| PATENT NO. | : 6,897,985 B1 | Page 1 of 1 |
| APPLICATION NO. | : 09/506807 | |
| DATED | : May 24, 2005 | |
| INVENTOR(S) | : K. Toyoda | |

It is certified that error appears in the above-identified patent and that said Letters Patent is hereby corrected as shown below:

At column 10, line 5 (claim 7, line 18) of the printed patent, after " @ " insert ---between the---.

Signed and Sealed this

Twenty-fifth Day of July, 2006

JON W. DUDAS
*Director of the United States Patent and Trademark Office*